(12) United States Patent
Kim et al.

(10) Patent No.: US 8,546,522 B2
(45) Date of Patent: Oct. 1, 2013

(54) METHOD FOR PREPARING FINE SPHERICAL POLYCARBONATE POWDERS AND METHOD FOR PREPARING HIGH MOLECULAR WEIGHT POLYCARBONATE RESIN USING SAME

(75) Inventors: Se Hoon Kim, Daejeon (KR); Sang Hyun Park, Daejeon (KR); Young Koan Ko, Seoul (KR)

(73) Assignee: Lotte Chemical Corporation, Seoul (KR)

( * ) Notice: Subject to any disclaimer, the term of this patent is extended or adjusted under 35 U.S.C. 154(b) by 245 days.

(21) Appl. No.: 13/139,528

(22) PCT Filed: Oct. 13, 2009

(86) PCT No.: PCT/KR2009/005884
§ 371 (c)(1),
(2), (4) Date: Jun. 14, 2011

(87) PCT Pub. No.: WO2010/076947
PCT Pub. Date: Jul. 8, 2010

(65) Prior Publication Data
US 2011/0245451 A1    Oct. 6, 2011

(30) Foreign Application Priority Data

Dec. 30, 2008  (KR) .................. 10-2008-0137193

(51) Int. Cl.
*C08F 6/00* (2006.01)

(52) U.S. Cl.
USPC .............. 528/502 R; 528/480; 528/502 F; 528/503; 422/129; 422/131; 422/245.1

(58) Field of Classification Search
USPC .............. 528/86, 193, 196, 480, 481, 484, 528/502 R, 502 F, 503; 422/129, 131, 245.1
See application file for complete search history.

(56) References Cited

U.S. PATENT DOCUMENTS 4,948,871 A  8/1990 Fuknoka et al.
5,717,056 A  2/1998 Varadarajan et al.
(Continued)

FOREIGN PATENT DOCUMENTS

JP   04-072326   3/1992
JP   07-009439   1/1995
(Continued)

OTHER PUBLICATIONS

Korean Intellectual Property Office, International Search Report for International Application No. PCT/KR2009/005884, May 25, 2010.
(Continued)

*Primary Examiner* — Frances Tischler
(74) *Attorney, Agent, or Firm* — Sherr & Jiang, PLLC

(57) ABSTRACT

Provided are a method for preparing fine round powdery polycarbonate and a method for preparing a high molecular weight polycarbonate resin using the same.

More specifically, provided are a method for preparing fine round powdery polycarbonate, comprising (A) polymerizing non-phosgene polycarbonate, (B) extruding the polycarbonate into fine round powdery amorphous polycarbonate, (C) surface-crystallizing the fine round powdery amorphous polycarbonate in the presence of a solvent or dispersion medium, and (D) drying the surface-crystallized fine round powdery polycarbonate, and a method for preparing high molecular weight polycarbonate resin capable of obtaining polycarbonates with various molecular weights ranging from low molecular weights to high molecular weights by continuously using the obtained fine round powdery polycarbonate via a solid state polymerization step. In accordance with the methods, it is possible to remarkably simplify crystallization of amorphous polycarbonate and thus to realize process continuousness and economical efficiency enabling commercial mass-production, and to overcome production of high molecular weight polycarbonate, the most serious problem of conventional non-phosgene melt polymerization processes.

10 Claims, 5 Drawing Sheets

(56) References Cited

U.S. PATENT DOCUMENTS

| | | |
|---|---|---|
| 6,031,062 A | 2/2000 | Day et al. |
| 7,148,312 B2 | 12/2006 | Kim et al. |
| 2006/0276580 A1 | 12/2006 | Williamson |
| 2008/0004418 A1 | 1/2008 | Jansen et al. |
| 2008/0064847 A1 | 3/2008 | Ito |
| 2008/0242828 A1 | 10/2008 | Kunishi |

FOREIGN PATENT DOCUMENTS

| | | |
|---|---|---|
| JP | 2546724 | 8/1996 |
| KR | 10-1992-0003711 | 5/1992 |
| KR | 10-0536528 | 12/2005 |

OTHER PUBLICATIONS

Stephen M. Gross et al., "Solid-State Polymerization of Polycarbonates Using Supercritical CO2", Macromolecules, 1999, pp. 3167-3169, vol. 32, No. 9, American Chemical Society.

METHOD FOR PREPARING FINE SPHERICAL POLYCARBONATE POWDERS AND METHOD FOR PREPARING HIGH MOLECULAR WEIGHT POLYCARBONATE RESIN USING SAME

CROSS REFERENCE TO PRIOR APPLICATIONS

This application is a National Stage Patent Application of PCT International Patent Application No. PCT/KR2009/005884 (filed on Oct. 13, 2009) under 35 U.S.C. §371, which claims priority to Korean Patent Application No. 10-2008-0137193 (filed on Dec. 30, 2008), which are all hereby incorporated by reference in their entirety.

TECHNICAL FIELD

The present invention relates a method for preparing fine round powdery polycarbonate and a method for preparing a high molecular weight polycarbonate resin using the same. More particularly, the present invention relates to a method for preparing fine round powdery polycarbonate, wherein polycarbonate with a constant molecular weight is prepared through a non-phosgene polycarbonate melt polymerization process, fine round powdery polycarbonate particles are realized through a continuous extrusion process to facilitate crystallization, and polycarbonates with a variety of molecular weights are provided through a continuous solid state polymerization process, and a method for preparing a high molecular weight polycarbonate resin using the same.

BACKGROUND ART

In recent years, polycarbonate resins play an important role in engineering plastics and have been developed based on their superior transparency and mechanical properties, since polycarbonate polymerization methods using bisphenol A were developed by Bayer and GE in 1950. At present, worldwide sales of polycarbonate are about 3,400,000 tones and polycarbonates are utilized in a variety of fields including optical applications including optical discs such as CDs and DVDs, extrusion sheets and films, electric and electronic products and automotive molding parts, based on their superior physical properties. Annual worldwide rate of growth in production of polycarbonates is 7% and is at least 10% in developing nations including China.

Commercialization of polycarbonate processes was initiated by Bayer in 1958 and was successively completed by GE in 1960. The initial commercialization process was a "phosgene process" in which bisphenol A and a phosgene gas are used as monomers, and the interfacial polymerization process using phosgene gas, is currently used as a polycarbonate process in various nations. However, the phosgene process is restricted due to facility safety and environmental problems resulting from use of the toxic gas and other problems such as large energy consumption and high construction costs derived from use of methylene chloride and water caused by selection of interfacial polymerization. As a result, a great deal of research had been continuously made on non-interfacial polymerization as a substitute for the interfacial polymerization, and development of a non-phosgene process has been initiated, since melt polymerization using bisphenol A and diphenyl carbonate was developed by Bayer in the early 1960s. In recent years, Asahi Kasei has successfully commercialized a process for preparing diphenyl carbonate using carbon dioxide and ethylene oxide as monomers and a non-phosgene polycarbonate process using wire reactors in melt polymerization of bisphenol A and diphenyl carbonate and widens the non-phosgene polycarbonate process in the world.

Other non-phosgene polycarbonate preparation techniques attempted by various companies include polycarbonate preparation techniques using melt polymerization and solid state polymerization. In particular, solid state polymerization is the best process to overcome preparation of polycarbonate with a high molecular weight, as one drawback of the non-phosgene process and a variety of techniques to realize this preparation are being introduced.

Solid state polymerization of polycarbonate requires induction of crystallization as a preliminary step. This induction step is considered the primary step to be solved in conventional techniques in order to realize solid state polymerization of polycarbonate.

However, in conventional techniques, crystallization of polycarbonate is induced in a solvent by introducing an organic solvent to dissolve polycarbonate, or by pelleting or grinding polymerized polycarbonate and crystallizing in the presence of heat or gaseous solvents, or by spraying polycarbonate dissolved in a solvent. These crystallization processes have disadvantages of use of a great amount of organic solvents and consumption of long time, thus making practical commercialization for solid state polymerization impossible.

In accordance with methods for crystallizing aromatic polycarbonate disclosed in U.S. Pat. No. 4,948,871 and JP Patent 2,546,724, crystalline porous polycarbonate is obtained by treating amorphous polycarbonate pre-polymers with acetone or heating the same for a long period of time. Such a crystallization method requires an additional process which cannot be continuously performed with melt polymerization and additional equipment and treatment time such as acetone recovery and washing. In addition, with this method, it is difficult to prepare porous polycarbonate particles with a uniform size and is thus impossible to realize polymerization uniformity in the solid state polymerization, the subsequent process. Another problem of this method is production of a great amount of non-uniform polycarbonate, in other words dust, due to friction and collision between particles caused by solid flow during solid state polymerization. This uneven polycarbonate dust is known to be a main factor degrading qualities of final products, such as induction of black spots and non-molten materials in the process of plastic molding.

In addition, U.S. Pat. No. 5,717,056 suggests a method for increasing polycarbonate crystallinity by treating a polycarbonate prepolymer with a dihydroxy aromatic compound and stirring the same in the presence of an alkali metal hydroxide catalyst and introduces realization of solid state polymerization of polycarbonate using the method. However, this method also disadvantageously requires stirring and reaction processes separately from melt polymerization to prepare a prepolymer and further entails a post-treatment process for solid state polymerization.

In accordance with the polycarbonate crystallization method introduced in U.S. Pat. No. 6,031,062, a polycarbonate prepolymer and diaryl carbonate are coextruded and then blended in an apparatus such as a mixer for a long time. Then, solid state polymerization is carried out in the mixer. This method has a disadvantage of impossibility of mass-production due to such a multi-step process.

U.S. Pat. No. 7,148,312 and KR Patent No. 0536528 disclose spray crystallization, comprising dissolving amorphous polycarbonate in a solvent to prepare a polycarbonate solution and spraying the solution using a nozzle to bring the solution into contact with a hot gas and thereby prepare crystalline polycarbonate. This crystallization method has an advantage of crystallization of polycarbonate within a relatively short time, but further requires a step for dissolving polycarbonate in a separate solvent after melt polymerization as a pre-crystallization step. Accordingly, this method also has a disadvantage of impossibility of efficient successive polymerization of non-phosgene polycarbonate. In addition, with this method, it is difficult to control particles of sprayed polycarbonate and thus solve the problems associated with polymerization uniformity in solid state polymerization and production of uneven polycarbonate dust of final products.

Accordingly, in order to solve these problems, there is an increasing need for a continuous non-phosgene polycarbonate process, based on efficient and simple crystallization process.

DISCLOSURE

Technical Problem

Therefore, the present invention has been made in view of the above problems, and it is one object of the present invention to provide a method for preparing fine round powdery polycarbonate wherein uniform round-shaped fine powdery polycarbonate particles are prepared to improve a polycarbonate crystallization step and thereby provide remarkable advantages in view of preparation time and costs.

It is another object of the present invention to prepare uniform round-shaped fine powdery polycarbonate particles and thereby increase uniformity of polymerization in a solid state polymerization step and remarkably reduce the amount of the polycarbonate dust produced in the process of polymerization.

It is another object of the present invention to realize a continuous solid state polymerization process using an efficient crystallization method in order to prepare high-molecular weight polycarbonate resins which cannot be prepared by conventional non-phosgene polycarbonate preparation processes.

It is another object of the present invention to extrude the polycarbonate prepolymer melt-polymerized by a non-phosgene process, induce rapid crystallization in the presence of a circulating dispersion medium, facilitate solid state polymerization via a continuous drying process, and thereby to realize preparation of non-phosgene polycarbonate resins via a continuous single process without additional equipment.

It is yet another object of the present invention to provide a method for preparing polycarbonate resins with a variety of molecular weight ranges.

Technical Solution

In accordance with an aspect of the present invention, the above and other objects can be accomplished by the provision of a method for preparing fine round powdery polycarbonate and a method for preparing a high molecular weight polycarbonate resin using the same, comprising (A) polymerizing an aromatic dihydroxy compound and diarylcarbonate into amorphous polycarbonate or a prepolymer thereof with a weight-average molecular weight of 20,000 g/mol or less; (B) extruding the amorphous polycarbonate or a prepolymer thereof into fine round powdery amorphous polycarbonate or a prepolymer thereof; (C) surface-crystallizing the fine round powdery amorphous polycarbonate or prepolymer thereof in the presence of a solvent or dispersion medium; and (D) drying the fine round powdery polycarbonate or prepolymer thereof.

The amorphous polycarbonate or prepolymer thereof may be prepared by a non-phosgene polymerization process.

Step (B) may be carried out using a multi-screw extruder or a banbury extruder.

The extruder may be provided with an extrusion die having micro-holes with a size of 100 to 900 microns.

Step (C) may be carried out at a temperature of 50 to 200° C.

The fine round powdery polycarbonate or a prepolymer thereof surface-crystallized in step (C) may have a crystallinity of 10 to 50%.

Step (D) may be carried out by separating the surface-crystallized fine round powdery polycarbonate or prepolymer thereof from the solvent or dispersion medium using a centrifugal separator, and vacuum-drying, dehumidification-drying or hot-air drying.

The fine round powdery polycarbonate or prepolymer thereof dried in step (D) has a water content less than 0.1%.

In accordance with another aspect of the present invention, provided are a method for preparing fine round powdery polycarbonate and a method for preparing a high molecular weight polycarbonate resin using the same, comprising solid state polymerization to continuously separate and discharge the fine round powdery polycarbonate or a prepolymer thereof according to the present invention using a solid state polymerization apparatus, based on the molecular weight thereof.

In the solid state polymerization, phenol may be removed from the fine round powdery polycarbonate or a prepolymer thereof under an inert gas atmosphere or vacuum at a temperature of 150 to 230° C. to increase the degree of polymerization.

The solid state polymerization apparatus may be a vertical, horizontal or diagonal solid state polymerization apparatus.

The solid state polymerization apparatus may be provided with one to three polycarbonate resin discharge lines.

Advantageous Effects

The present invention provides a method for preparing fine round powdery polycarbonate, a method for preparing a high molecular weight polycarbonate resin using the same, and a preparation apparatus thereof, wherein a non-phosgene polycarbonate process is used to provide environmental friendliness, and polycarbonate or a prepolymer thereof is prepared in a fine round powdery shape and surface-crystallization is performed in the presence of a dispersion medium to considerably improve continuousness and efficiency of the crystallization process.

In addition, it is possible to directly perform solid state polymerization without any bottleneck.

Meanwhile, the polycarbonate or prepolymer thereof surface-crystallized in a fine round powder state still maintains its shape in the solid state polymerization step, thus considerably increasing surface area and enhancing phenol removal efficiency, and maintains the uniform round shape, thus readily controlling an increase in molecular weight based on retention time.

For this reason, polycarbonates with a variety of molecular weights in the solid state polymerization process can be simultaneously prepared, and polycarbonate resins with a considerably reduced amount of uneven polycarbonate dust than are produced in conventional pellet transportation and solid state polymerization processes owing to the advantages of round particles can thus be prepared.

DESCRIPTION OF DRAWINGS

The above and other objects, features and other advantages of the present invention will be more clearly understood from the following detailed description taken in conjunction with the accompanying drawings, in which.

BEST MODE

Figure 1:
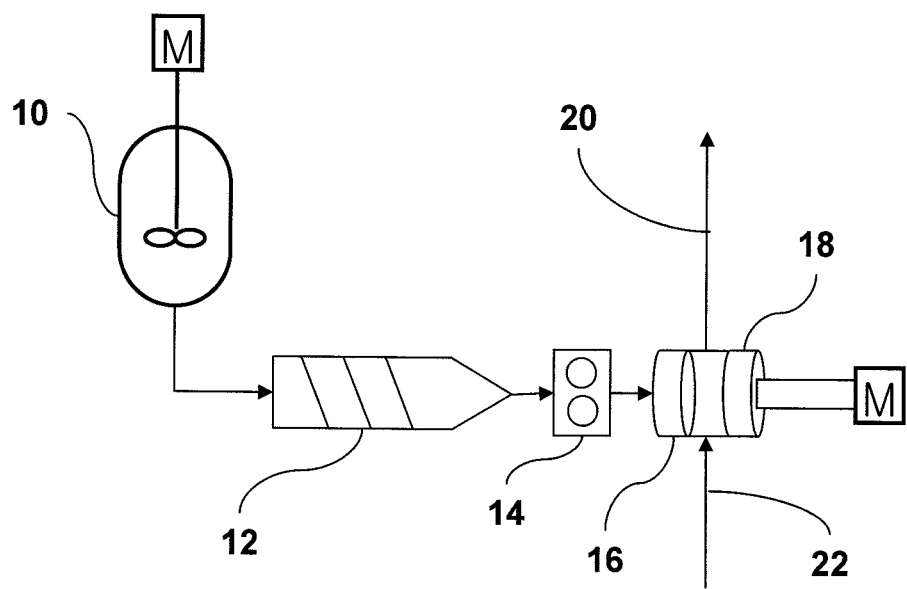
FIG. 1 is a system configuration view illustrating a non-phosgene process to polymerize amorphous polycarbonate or a prepolymer thereof and extrude the same through a micro extrusion die.

Hereinafter, preferred examples of the present invention will be described with reference to the annexed drawing in detail so that they could be easily carried out by a person having an ordinary knowledge in the art.

However, the present invention may be realized by a variety of equivalents and modifications of examples and is not limited to the examples described below. In addition, for better understanding, contents unrelated to the description in the drawing will be omitted.

(1) Polymerizing Amorphous Polycarbonate or Prepolymer Thereof and Extruding the Same Using Micro Extrusion Die Holes The amorphous polycarbonate or prepolymer thereof used herein is obtained by melt-polymerizing an aromatic dihydroxy compound and diaryl carbonate and has a weight-average molecular weight of 1,000 to 20,000 g/mol, preferably, 2,000 to 15,000 g/mol, more preferably, 4,000 to 12,000 g/mol.

Examples of polycarbonates satisfying the aforementioned conditions include polycarbonate homopolymers polymerized from bisphenol A and diphenyl carbonate, polycarbonate homopolymers polymerized from dihydroxy compounds and diaryl carbonate derivatives and polycarbonate copolymers. The polycarbonate may be used alone or in combination thereof.

As to the preparation apparatus used herein, the polycarbonate or prepolymer thereof is prepared in a stirred-reactor. After the weight-average molecular weight of the polycarbonate or prepolymer thereof reaches a predetermined range, a fine round powdery amorphous polycarbonate or prepolymer thereof is continuously prepared in a melted state in an extruder equipped with a micro extrusion die holes and a cutter.

Examples of preferred extruders that can be used in the present invention include single or twin screw extruders, multi-screw (including three or more screws) extruders, and banbury type extruders.

The micro extrusion die equipped with the extruder is realized with a die having microscopic holes with a diameter of 900 microns or less, preferably 200 to 500 microns.

The fine round powdery amorphous polycarbonate or prepolymer thereof extruded using the micro extrusion die has an average particle diameter of 100 to 900 microns.

(2) Crystallizing and Drying Fine Round Powdery Amorphous Polycarbonate or Prepolymer Thereof in the Presence of Circulating Solvent or Dispersion Medium The amorphous polycarbonate or prepolymer thereof is extruded through micro die holes in step (1) and, at the same time, contacts the dispersion medium in an underwater manner, and is prepared into fine round powdery amorphous polycarbonate or a prepolymer thereof using a cutter provided with a rotary blade.

Any non-solvent may be used as the dispersion medium so long as the fine round powder shape of amorphous polycarbonate or prepolymer thereof can be maintained. Preferred dispersion media include water, alcohols, glycols and acetone. The dispersion medium may be used alone or in combination thereof.

The fine round powdery polycarbonate or prepolymer thereof should be subjected to surface-crystallization together with the dispersion medium at a temperature range of 50 to 200° C., preferably 80 to 180° C. for a predetermined period.

After crystallization, the fine round powdery polycarbonate or prepolymer thereof has a crystallinity of 10 to 50%, preferably 20 to 40%.

The fine round powdery polycarbonate or prepolymer thereof having the predetermined crystallinity is separated from the dispersion medium using a centrifugal separator. The dispersion medium is stored in a separate dispersion medium storage tank and then returned to a micro extrusion die line by a temperature controller and reused. The separated fine round powdery crystalline polycarbonate or prepolymer thereof is moved to a drier and is then continuously vacuum, dehumidification or hot air dried.

After drying, the water content of the fine round powdery polycarbonate or prepolymer thereof reaches a level less than 0.1%.

(3) Continuously Solid State-Polymerizing Crystallized Fine Round Powdery Polycarbonate or Prepolymer Thereof to Prepare Polycarbonate Resins Having Various Molecular Weights The crystallized fine round powdery polycarbonate or prepolymer thereof dried in step (2) is transferred to a vertical or horizontal solid state polymerization process system via a transportation line. The solid state polymerization process used herein enables simultaneous production of polycarbonate or prepolymer thereof with different molecular weights.

The horizontal or vertical solid state polymerization process is carried out under a nitrogen atmosphere or vacuum to remove phenol from the surface-crystallized fine round powdery polycarbonate or prepolymer thereof.

In the solid state polymerization process, phenol removal is uniformly controlled by maintaining wide surface area due to the fine round shape and uniform particle size. Accordingly, the molecular weight increases in proportion to the retention time in the solid state polymerization process. For this reason, molecular weight can be estimated based on retention time, polycarbonate resins polymerized for different retention times can be discharged through a valve during the horizontal or vertical solid state polymerization process and polycarbonate resins having various molecular weights can be simultaneously prepared.

In addition, the polycarbonate resin can maintain its fine round powdery shape during the solid state polymerization process, thus advantageously remarkably reducing production of polycarbonate dust from pellets and flakes which cannot be solved with conventional techniques.

As to the apparatus used for the solid state polymerization process, in the case of horizontal solid state polymerization process, similar to the extruder, the fine round powdery polycarbonate is moved by rotating the screw, or moving an exterior cylinder based on the stationary axis, the overall solid state polymerization process is operated under a hot nitrogen atmosphere or high-vacuum to efficiently remove phenol present in the polycarbonate resin.

On the other hand, in the case of vertical solid state polymerization process, the crystalline fine round powdery polycarbonate or prepolymer thereof is supplied to the vertical cylinder and fills the cylinder until a vertical level is formed. While the crystalline fine round powdery polycarbonate moves in the cylinder from top to bottom, phenol is removed by the hot nitrogen flow, to perform solid state polymerization. Otherwise, a spiral shelf is designed to be provided in a vertical cylinder so that the fine round powdery polycarbonate can naturally flow from top to bottom.

Hereinafter, preferred preparation examples of the present invention will be described with reference to the annexed drawings in detail.

Preparation Example 1

Preparation of Fine Round Powdery Amorphous Polycarbonate

FIG. 1 is a process view illustrating a step for polymerizing amorphous polycarbonate or prepolymer thereof according to the present invention and extruding the same through a micro extrusion die.

First, bisphenol A and diphenyl carbonate are supplied to a stirred polymerization apparatus 10, $10^{-8}$ mol of a lithium hydroxide catalyst, based on one mole of bisphenol A is added thereto, the reaction temperature is slowly elevated to about 230° C. with stirring and the reaction pressure is slowly dropped to about 50 torr. When the weight-average molecular weight reaches about 5,000, melted polycarbonate is supplied to an extruder 12. The extruder 12 used herein may be a single-screw extruder, since it does not require mixing. Preferably, the extruder 12 includes devolatilization equipment to provide a nitrogen or vacuum atmosphere in order to prevent decomposition of melt polycarbonate resin. Then, the polycarbonate resin melted using the extruder is supplied to a gear pump 14 and then conveyed at predetermined flow rate and amount to a micro extrusion die 16 provided with 300 micron microscopic holes using the gear pump 14.

While passing through the microscopic holes of micro extrusion die 16 at a predetermined pressure by the gear pump, the polycarbonate resin is extruded into a fine particle diameter, contacts the dispersion medium supplied through the dispersion medium shift line 22, and, at the same time, is prepared into a fine round powdery polycarbonate resin by a rotary cutter 18. At this time, the prepared fine round powdery polycarbonate has an average particle diameter of 335 microns.

Preparation Example 2

Crystallizing and Drying Fine Round Powdery Polycarbonate

Figure 2:
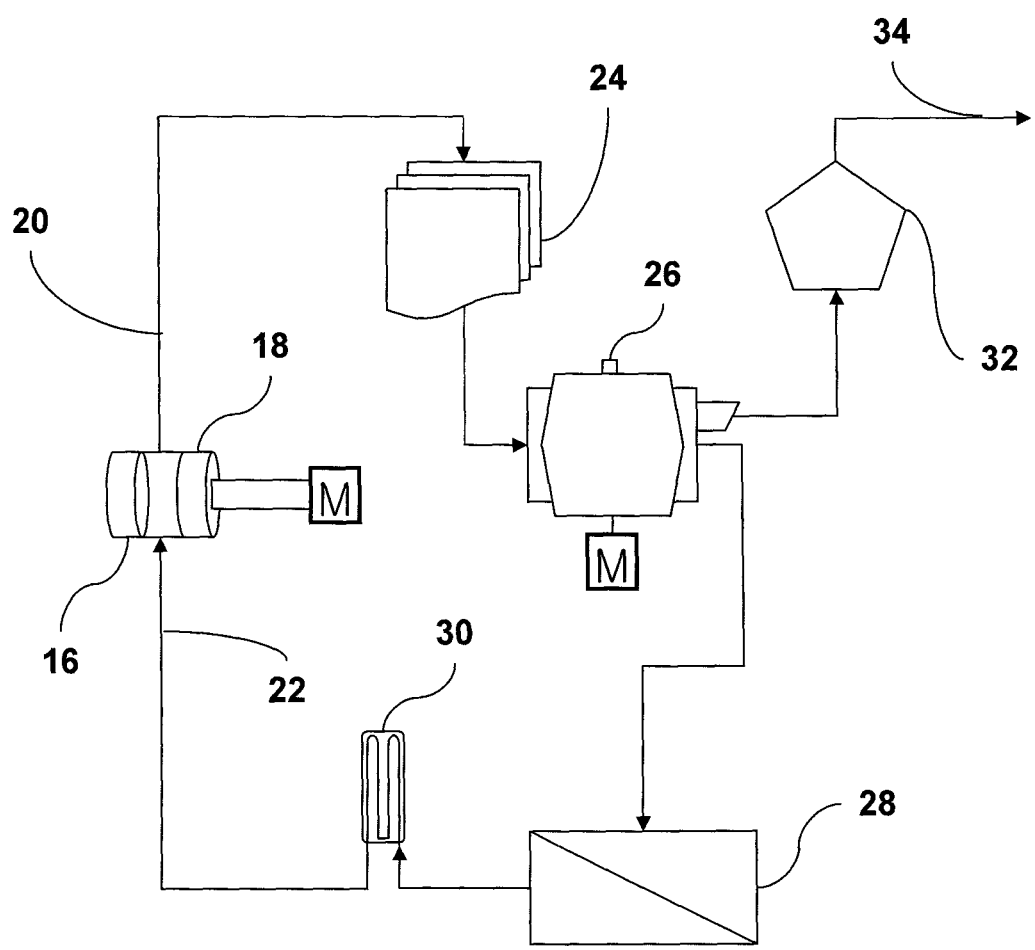
FIG. 2 is a system configuration view illustrating a process flow related to crystallization and drying of fine round powdery amorphous polycarbonate.

FIG. 2 is a process flow chart illustrating a differentiated crystallization method to prepare a high molecular weight polycarbonate resin according to the present invention.

The dispersion medium supplied from the lower part of the rotary cutter 18 is moved to the crystallization shift line 20 together with fine round powdery polycarbonate. At this time, the temperature of the dispersion medium should be maintained to facilitate crystallization of fine round powdery polycarbonate.

The fine round powdery polycarbonate is conveyed together with the dispersion medium at a crystallization-facilitating temperature, subjected to a surface-crystallization process 24 and then supplied to a centrifugal separator 26. In the centrifugal separator 26, the surface-crystallized fine round powdery polycarbonate is separated from the dispersion medium, and the polycarbonate fine round powder separated from the dispersion medium is supplied to a dehumidification drier 32, while maintaining the surface-crystallization state. In addition, the dispersion medium separated in the centrifugal separator 26 is conveyed to a dispersion medium storage tank 28, heated to a predetermined temperature via a heat exchanger 30 and circulated to a fine round powder cutter. The surface-crystallized fine round polycarbonate powder dried in the dehumidification drier 32 is subjected to a continuous process and solid state polymerization process 36 via a shift line 34 in the solid state polymerization process. The fine round polycarbonate powder passing through the dehumidification drier 34 has crystallinity of about 35%, and the round surface thereof is entirely crystallized and is maintained in the subsequent process (solid state polymerization process), without causing any lumps, and remarkably reducing production of uneven polycarbonate dust due to collision between particles.

Preparation Example 3

Preparation of Polycarbonate Resins Having Various Molecular Weights

Figure 3:
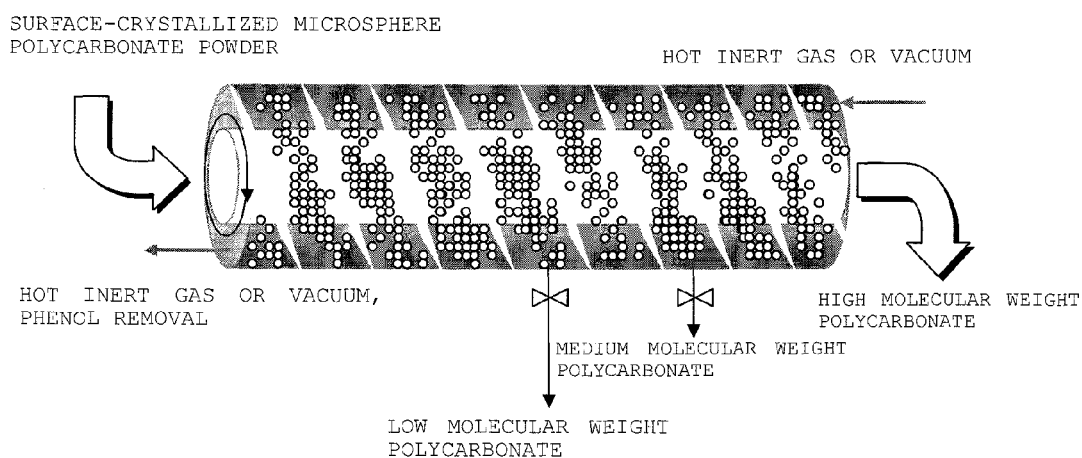
FIG. 3 is a schematic view illustrating a horizontal solid state polymerization apparatus.
Figure 4:
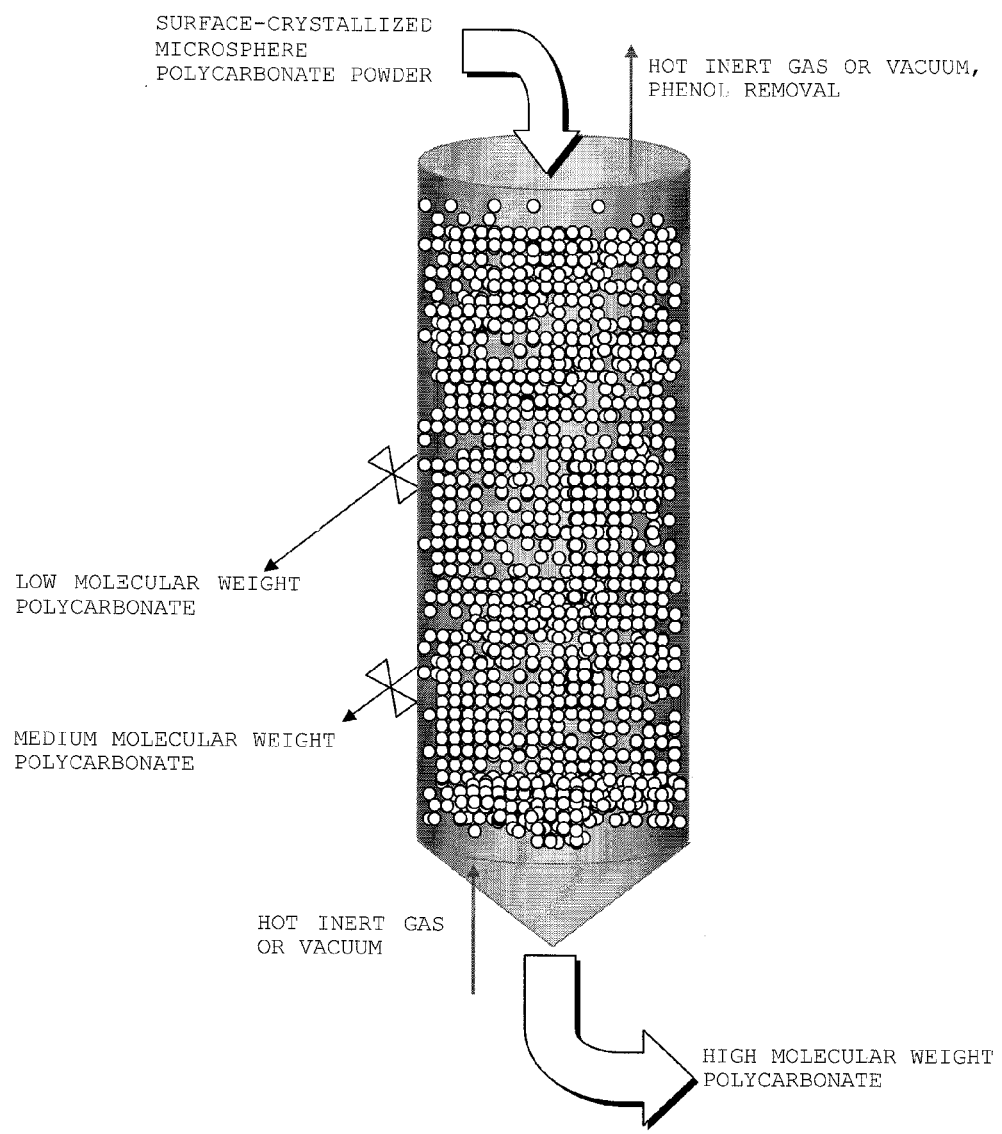
FIG. 4 is a schematic view illustrating a vertical solid state polymerization apparatus.

FIG. 3 is a schematic view illustrating a horizontal solid state polymerization apparatus for solid-polymerizing various molecular weights of polycarbonate. FIG. 4 is a schematic view illustrating a vertical solid state polymerization apparatus for solid-polymerizing various molecular weights of polycarbonate. The solid state polymerization process 36 of FIG. 5 may utilize a horizontal solid state polymerization process of FIG. 3, a vertical solid state polymerization process of FIG. 4, or a sloped horizontal solid state polymerization process. This Preparation Example is described based on the horizontal solid state polymerization process.

The crystallized fine round powdery polycarbonate is slowly moved forward in the horizontal solid state polymerization apparatus in a screw rotation manner and can be operated at a gradient within a temperature range of about 180° C. to 220° C. In addition, in the solid state polymerization process, in order to remove phenol in the fine round powder, the solid state polymerization apparatus is operated under vacuum or heated nitrogen gas should be moved opposite to the movement direction of the fine round powder. The phenol is removed from the fine round polycarbonate powder via internal screw rotation in the solid state polymerization apparatus to efficiently increase polymerization degree and a separate valve is provided after the center of the solid state polymerization apparatus to produce polycarbonate with a desired molecular weight range. Accordingly, the solid state polymerization apparatus according to the present invention enables preparation of polycarbonate resins with molecular weights which constantly increase in proportion to retention and process times. That is, a low molecular weight polycarbonate resin is discharged via the line having the shortest retention time in the solid state polymerization apparatus 40, an intermediate molecular weight polycarbonate is discharged in the center thereof 41, and a high molecular weight polycarbonate resin is discharged in the outermost region of the solid state polymerization process 42. As a result, it is possible to prepare a polycarbonate resin having a melt flow index of 5 g/10 min or less and a weight-average molecular weight of 30,000 g/mol or more, which cannot be obtained by conventional non-phosgene polycarbonate polymerization processes.

Figure 5:
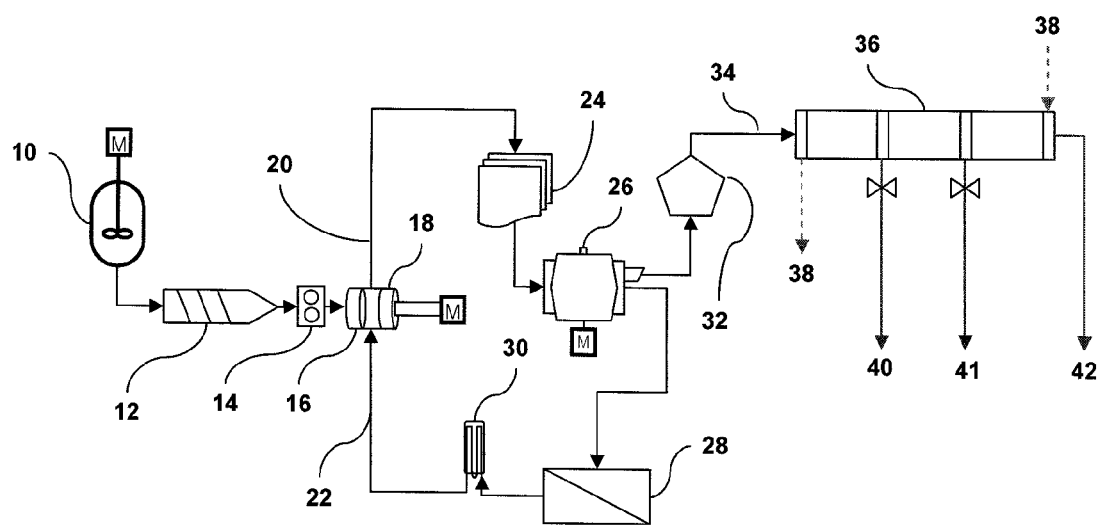
FIG. 5 is a system configuration view illustrating a continuous process flow associated with a method for preparing fine round powdery polycarbonate and a method for preparing a high molecular weight polycarbonate resin using the same.

FIG. 5 is a process view illustrating the processes of Preparation Examples 1, 2 and 3, and more specifically, a continuous process view illustrating a method for preparing a fine round powdery polycarbonate using a non-phosgene polymerization process according to the present invention and a method for preparing a high molecular weight polycarbonate resin using the same.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for preparing a high molecular weight polycarbonate resin using fine round powdery polycarbonate, comprising:
   (A) supplying an aromatic dihydroxy compound and diarylcarbonate to stirred polymerization apparatus and melt-polymerizing an aromatic dihydroxy compound and diarylcarbonate into amorphous polycarbonate or a prepolymer thereof with a weight-average molecular weight of 20,000 g/mol or less;
   (B) extruding the melted amorphous polycarbonate or a prepolymer thereof into a fine round powdery amorphous polycarbonate or a prepolymer thereof without performing a separate grinding process, by an extruder with a cutter and an extrusion die having microscopic holes with a size of 100 to 900 microns;
   (C) surface-crystallizing the extruded fine round powdery amorphous polycarbonate or prepolymer thereof in the presence of a solvent or dispersion medium which directly contacts the extruded fine round powdery amorphous polycarbonate or prepolymer thereof after said extruding, wherein a non-solvent is used as the dispersion medium for maintaining the extruded fine round powdery amorphous polycarbonate or prepolymer thereof in a fine round powder shape;
   (D) drying the fine round powdery polycarbonate or prepolymer thereof and maintaining the fine round powder shape, wherein the dispersion medium is separated from the fine round powdery polycarbonate or prepolymer thereof, returned to a micro extrusion die line, and then reused;
   (E) conveying the dried fine round powdery polycarbonate or prepolymer thereof to a solid state polymerization apparatus; and
   (F) performing a solid state polymerization to continuously separate and discharge the conveyed fine round powdery polycarbonate or the prepolymer thereof, using a solid state polymerization apparatus, based on the molecular weight thereof,
   wherein the steps (A) to (F) are performed via a continuous single process.

2. The method according to claim 1, wherein in the solid state polymerization, phenol is removed from the fine round powdery polycarbonate or a prepolymer thereof under an inert gas atmosphere or vacuum at a temperature of 150 to 230° C. to increase the degree of polymerization.

3. The method according to claim 1, wherein the solid state polymerization apparatus is a vertical, horizontal or diagonal solid state polymerization apparatus.

4. The method according to claim 3, wherein the solid state polymerization apparatus is provided with one to three polycarbonate resin discharge lines.

5. The method according to claim 1, wherein the amorphous polycarbonate or prepolymer thereof is prepared by a non-phosgene polymerization process.

6. The method according to claim 1, wherein step (B) is carried out using one selected from a group consisting of a single-screw extruder, a twin-screw extruder, a multi-screw extruder and a banbury type extruder.

7. The method according to claim 1, wherein the step (C) is carried out at a temperature of 50 to 200° C.

8. The method according to claim 1, wherein the fine round powdery polycarbonate or a prepolymer thereof surface-crystallized in step (C) has a crystallinity of 10 to 50%.

9. The method according to claim 1, wherein step (D) is carried out by separating the surface-crystallized find round powdery polycarbonate or prepolymer thereof from the solvent or dispersion medium using a centrifugal separator, and vacuum-drying, dehumidification-drying or hot-air drying.

10. The method according to claim 1, wherein the fine round powdery polycarbonate or prepolymer thereof dried in step (D) has a water content less than 0.1%.

* * * * *